(12) United States Patent
Hecht et al.

(10) Patent No.: US 6,417,468 B2
(45) Date of Patent: Jul. 9, 2002

(54) MODULAR STEERING COLUMN MOUNTED SWITCH SYSTEM

(75) Inventors: Walter Hecht, Bietigheim-Bissingen; Rudolf Klein, Lauffen, both of (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 09/897,892

(22) Filed: Jul. 5, 2001

Related U.S. Application Data

(63) Continuation of application No. 09/214,767, filed on May 24, 1999.

(51) Int. Cl.$^7$ ................................................ H01H 9/00
(52) U.S. Cl. .................... 200/61.27; 200/61.54
(58) Field of Search ............... 200/61.27, 61.54–61.57; 307/9.1, 10.1, 10.7

(56) References Cited

U.S. PATENT DOCUMENTS

| | | | | |
|---|---|---|---|---|
| 4,743,883 A | * | 5/1988 | Yoshimi et al. | 340/52 R |
| 5,396,106 A | * | 3/1995 | Chretien et al. | 307/10.1 |
| 5,780,796 A | * | 7/1998 | Uchiyama et al. | 200/61.54 |
| 5,895,899 A | * | 4/1999 | Sano | 200/61.54 |
| 5,977,494 A | * | 11/1999 | Sano et al. | 200/61.54 |
| 5,977,495 A | * | 11/1999 | Akimoto | 200/61.54 |
| 6,025,565 A | * | 2/2000 | Miyase et al. | 200/61.28 |

* cited by examiner

*Primary Examiner*—Michael Friedhofer
(74) *Attorney, Agent, or Firm*—Paul Vincent

(57) ABSTRACT

The invention concerns a modular steering column mounted switch system for motor vehicles which is organized according to the internal functions of the switch. The steering column mounted switch system contains a plurality of functional modules which correspond to the internal functions. Should the demands for operation and/or design of a particular module change, the associated module can be easily replaced. All other functional modules remain unchanged, to thereby permit simple adaptation of the steering column mounted switch to the given operation and design demands. When there is a defect, the modular steering column mounted switch can also be easily repaired and in an economical fashion by simple replacing the defective functional module.

7 Claims, 2 Drawing Sheets

MODULAR STEERING COLUMN MOUNTED SWITCH SYSTEM

This application is a continuation of application Ser. No. 09/214,767 filed May. 24, 1999 and claims Paris Convention priority of DE 196 27 761.1 filed Jul. 10, 1996, the complete disclosure of which are hereby incorporated by reference.

BACKGROUND OF THE INVENTION

The invention relates to a modular steering column mounted switch system for a motor vehicle.

Modular steering column mounted switches are disclosed in DE 2,810,790 and WO 95/13936. These steering column mounted switches have a modular construction which is defined by the technical requirements of assembly or of installation in a vehicle or which has a modularity determined by the external functions to be executed by the switch, such as operation of the light systems or of the window washing systems. The modularity does not reflect a division dictated by the different internal functions of the switch, such as the reception of external mechanical signals, the processing of internal mechanical signals, the mechanical switching of electrical switches, and/or the electrical switching and control of load current and of control current. These various internal functions of the switch assemblies are all integrated in a single module. Requisite electrical subassemblies for the switching and control of load and control currents, the switches and mechanical components for external operation of the switch functions as well as the current terminal connections to the external assemblies which are to be controlled (lights, blinkers, signal horn etc.) are combined, to the greatest possible extent, into one single module. In these conventional steering column mounted switches, failure of one internal function disadvantageously causes the overall module to be defective and to require replacement. In addition, a specific modification of the switch system to the functional needs and design requirements of certain motor vehicles cannot be realized by only changing the components and assemblies that are affected, rather the entire module must be reconfigured.

In view of these deficiencies in prior art, it is the purpose of the present invention to introduce a steering column mounted switch which is more economical to produce and to repair.

SUMMARY OF THE INVENTION

This purpose is achieved in accordance with the present invention with a steering column mounted switch having modules which are configured and assembled in accordance with functional and design requirements and which may be individually replaced in case of defect.

The modular construction of the switch in accordance with the invention is therefore defined by its internal functions. These internal functions of the switch include the accommodation of functional subassemblies and their mounting to the steering column, the receiving and processing of external mechanical signals as well as the switching and control of internal electrical signals. The inventive structure facilitates flexibility in functional group combinations as required by the application. The subdivision of the inventive switch into modules according to function makes repair and maintenance considerably more economical since only defective parts must be replaced. In addition, manufacture is considerably more economical since higher piece counts can be produced.

In accordance with the invention, the different functions required of a steering column mounted switch are consistently assigned to separate individual modules which are detachable from each other and which, when assembled, form the entire switch. For example, one or more modules may be provided which have mechanical functions only to convert the manual operation of the driver (e.g. twisting or turning with respect to the steering column) into a corresponding mechanical movement of a switch member. The at least one mechanical module cooperates with at least one additional module which substantially performs electrical functions only such as electrical connections and optionally electrical amplification and filtering. There is therefore a clearly separated boundary between mechanical and electrical operations. These functions are then combined via interfaces between the corresponding modules. A module may also be provided which exclusively serves to anchor the other modules to the steering column in a simple way. Such a module therefore serves to receive functional subassemblies and to mount them to the steering column. Another module may also be provided which performs a measuring function, e.g. measuring the turning angle of the steering wheel and, consequently, of the steering column relative to the retaining case of the steering column, wherein the steering column mounted switch is mounted to that retaining case.

When a desired change is performed on a switch, this is usually directed to a certain function. For example, it is possible that only the external design of a switch lever module is to be changed or adapted to the spatial conditions of a new type of motor vehicle. In this event, only the associated module or modules must be modified and the construction of the module having the electrical circuit connections need not be changed. In addition, a module which carries electrical circuits may be furnished having built-in auxiliary features to enable new switching functions in conjunction with the insertion of a corresponding mechanical module to e.g. convert switching movements made by the driver into corresponding contact changes on the electrical module (electric board).

Conversely, certain mechanical movements of a shift lever may be assigned new electrical functions. In this case, only an electrical module must be replaced while the mechanical module(s) may remain unchanged. By changing the mounting module used to mount all of the other modules to the steering column housing, a switch can be adapted to different housing and, consequently, to different types of motor vehicles with the remainder of the switch advantageously remaining unchanged. The invention is therefore particularly well suited for adapting a switch to new electrical or mechanical requirements, since only one of the corresponding modules must be replaced. This is also the case in the event that new technical developments are to be incorporated.

An embodiment of the invention is described below with the assistance of the figure.

DESCRIPTION OF THE PREFFERED EMBODIMENT

Figure 1:
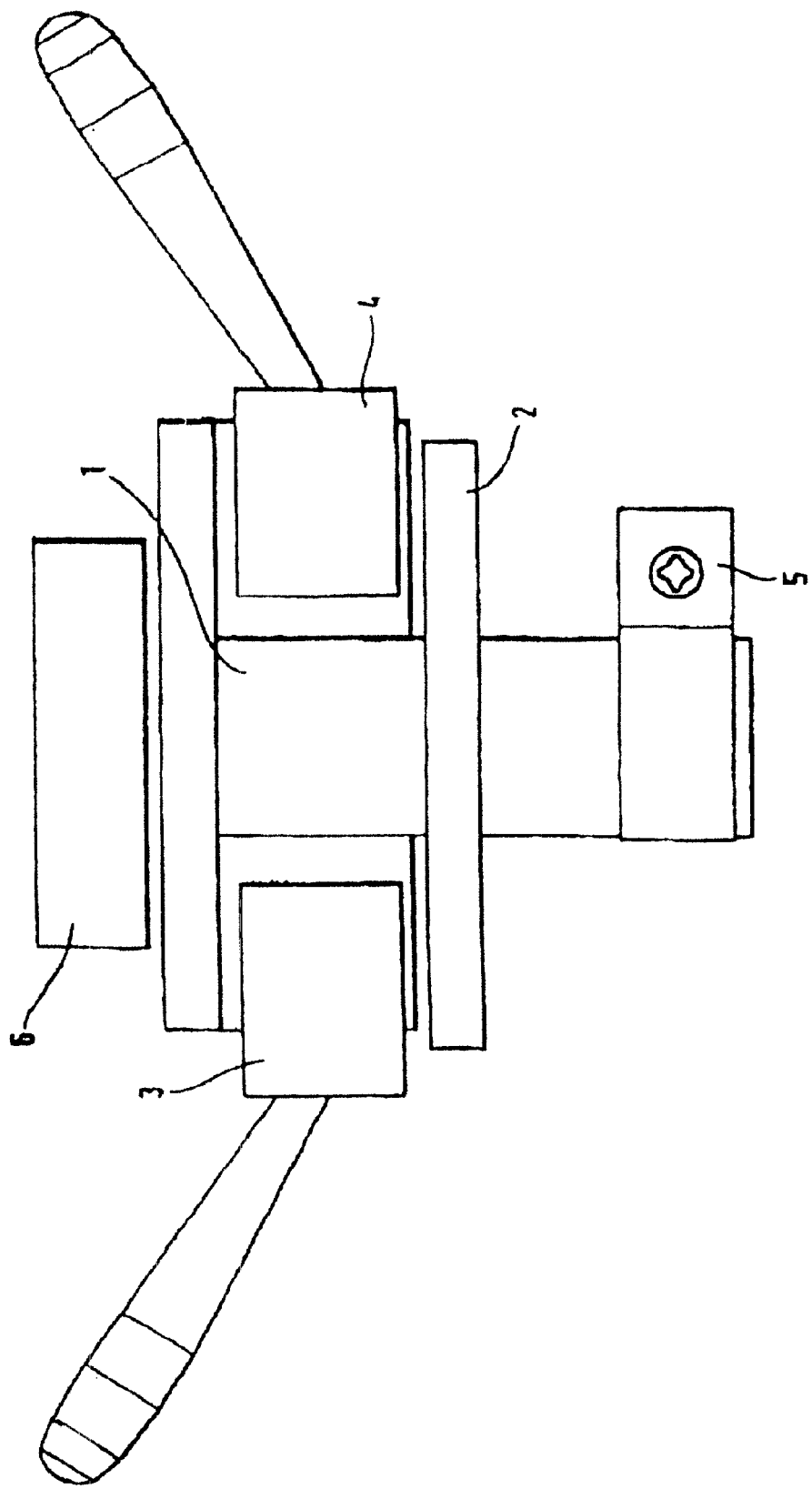
FIG. 1 shows a schematic side view of a modular steering column mounted switch consisting of six modules.
Figure 2:
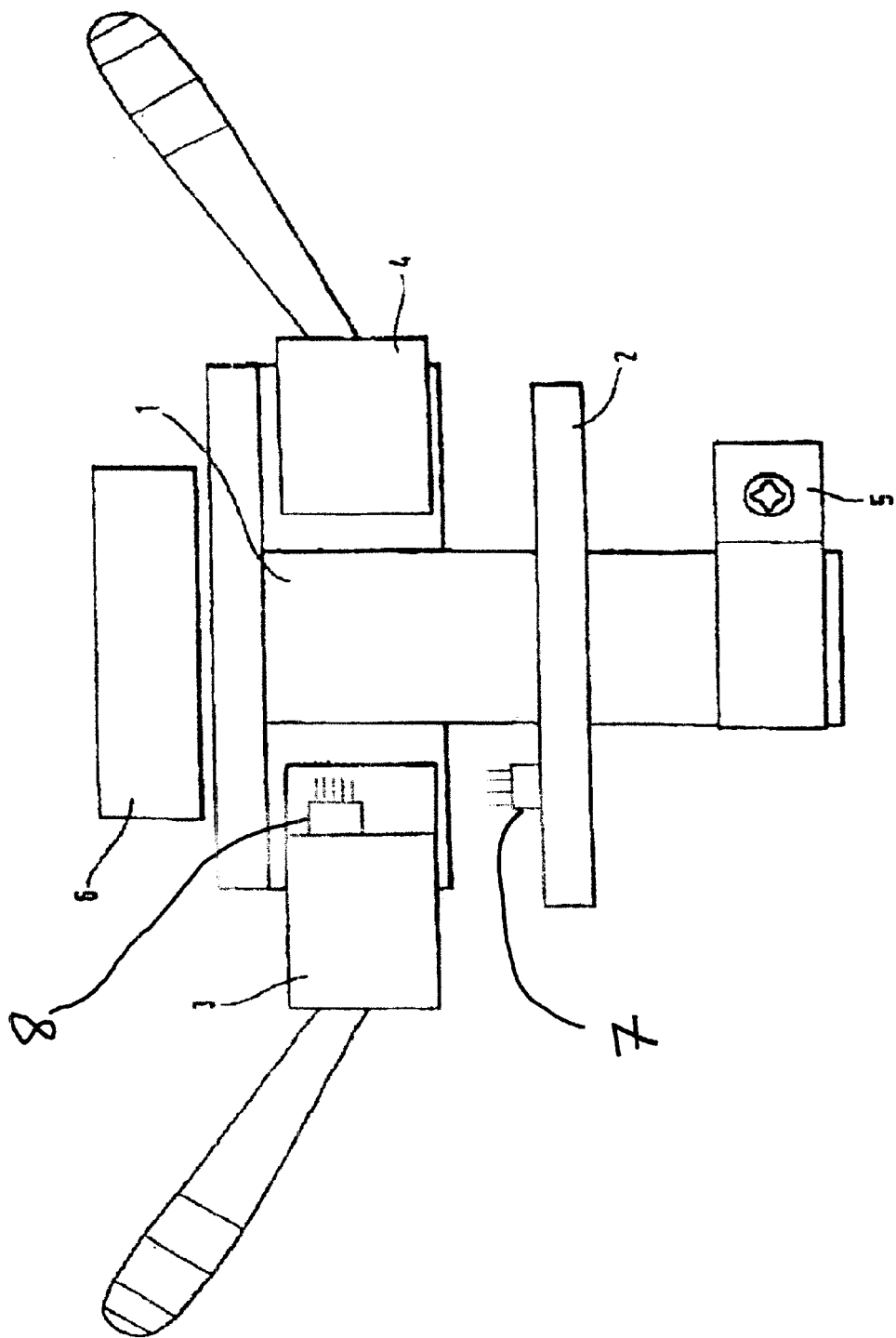
FIG. 2 shows the switch of FIG. 1 with two modules in a detached state.

The switch of FIGS. 1 and 2 comprises a receptacle 1 that defines internal interfaces 7, 8 among the operation modules 3, 4, steering angle sensor 6, and an electrical board 2. The electrical board 2 comprises all subassemblies necessary for switching current, distributing current, controlling current and for electronic control. Each operation module 3, 4 is a mechanically constructed functional group which serves to receive external signals mechanically and to transfer them to the electrical board 2. A mounting bracket 5 serves to fix the modular steering column mounted switch to the steering column of a motor vehicle. A steering angle sensor 6 serves to sense the current steering angle of the vehicle.

If, in vehicles of different manufacturers, identical technical functions but different designs are required of a steering column mounted switch, then the invention enables use of identical basic function modules such as the receptacle 1 and the electrical board 2 while facilitating exchange of operation modules that characterize design.

This is also possible for differing functions of individual operation modules 3, 4 or of the entire steering column mounted switch. If interfaces are defined in terms of mechanical and electrical function, corresponding individual functional modules may be combined with each other, independent of their function and of their constructive design, in accordance with functional and/or design demands.

A modular design of an overall system also simplifies repair. When a functional module is defective, the defect is eliminated through replacement of the module, without affecting the remaining components of the steering column mounted switch system.

Should increased complexity of functional requirements necessitate more complex mechanical and electrical interfaces, the operation modules 3, 4 and electrical board 2 can be furnished with additional interfaces 7, 8 that fit together with each other and which can then be exchanged.

If it is necessary to expand functions through use of an electronic controller for bus operation to control miscellaneous electronic functions, the electrical board 2 is exchanged for a board equipped with a controller.

In order to integrate a steering angle sensor 6 into a steering column mounted switch, the receptacle 1 and the electrical board 2 are modified to receive the sensor 6, while retaining the interfaces 7, 8 for the operation modules 3, 4. The sensor 6 is integrated but all other modules may then be used unchanged.

We claim:

1. A modular steering column mounted switch for a motor vehicle comprising:

a first module, said first module performing substantially mechanical functions only including at least one of reception of external signals, signal transfer and internal switching of contacts, said first module having a first module interface for electrical communication with said first module;

a second module, said second module performing a plurality of differing substantially electrical functions only, including at least two of current switching, current distribution and current control, said second module having a second module interface in electrical communication with said first module interface; and means for mounting said first module and said second module to a steering column, wherein said first module interface and said second module interface each comprise means structured for simplified and rapid connection and disconnection of said first module and said second module to said mounting means for replacement and exchange of said first module and said second module.

2. The steering column mounted switch for a motor vehicle of claim 1, wherein said mounting means comprises a receptacle means in which said first module and said second module are connected.

3. The steering column mounted switch for a motor vehicle of claim 2, wherein said mounting means comprises a mounting unit mounted to said receptacle means as a separate subassembly.

4. The steering column mounted switch for a motor vehicle of claim 2, wherein said mounting means comprises a mounting unit integral with said receptacle means.

5. The steering column mounted switch for a motor vehicle of claim 1, wherein said second module comprises an electrical board having an electronic controller for bus operation to control a plurality of functions.

6. The steering column mounted switch for a motor vehicle of claim 1, further comprising a steering angle sensor mounted to said mounting means.

7. The steering column mounted switch for a motor vehicle of claim 1, wherein said rapid connecting and disconnecting means comprise a plug-in connection.

* * * * *